United States Patent
Trunko

[19]

[11] Patent Number: 5,833,221
[45] Date of Patent: Nov. 10, 1998

[54] UNIVERSAL FLY TYING VISE

[75] Inventor: Chris P. Trunko, 1114 Derbydale Rd., Akron, Ohio 44306

[73] Assignee: Chris P. Trunko, Akron, Ohio

[21] Appl. No.: 656,889

[22] Filed: May 30, 1996

[51] Int. Cl.⁶ .................................................. B25B 1/00
[52] U.S. Cl. ................................... 269/3; 269/4; 269/71; 269/236; 269/907
[58] Field of Search ........................... 269/3, 4, 45, 236, 269/907, 76, 71; 43/1

[56] References Cited

U.S. PATENT DOCUMENTS

| | | |
|---|---|---|
| 2,120,571 | 6/1938 | Reichenstein et al. . |
| 2,486,142 | 10/1949 | Fong .......................................... 269/45 |
| 2,636,822 | 4/1953 | Anderson . |
| 2,638,805 | 5/1953 | Bigelow ....................................... 269/3 |
| 2,908,303 | 10/1959 | Schmidt .................................. 269/236 |
| 4,070,011 | 1/1978 | Glesser ...................................... 269/45 |
| 4,094,497 | 6/1978 | Stratton . |
| 4,216,948 | 8/1980 | Carter . |
| 4,322,065 | 3/1982 | Doiron . |
| 4,375,284 | 3/1983 | Doiron . |
| 4,508,328 | 4/1985 | Kojima . |
| 4,526,308 | 7/1985 | Dovey . |
| 4,969,636 | 11/1990 | Gautam . |

*Primary Examiner*—Robert C. Watson
*Attorney, Agent, or Firm*—Emerson & Associates; Roger D. Emerson; Mark E. Duell

[57] ABSTRACT

A clamping apparatus for use in tying fishing flies is disclosed that includes a vise with parallel first and second extended portions with aligned holes, and a trigger pin disposed through holes that has a circular and flat first end adjacent to the first extended portion and a threaded second end adjacent to the second extended portion with a knob screwed on the end. The clamping apparatus also includes a trigger with a circular portion that has pinhole offset from a center of the circular portion. The pinhole is aligned with a pinhole in the circular portion of the trigger pin, and a pin is disposed through the pinholes. The vise is attached to an arm that is attached to a base. Two legs extend from the base to support the clamping apparatus. Foot joints are located at the ends of the legs and are connected to a flexible member that stabilizes the clamping apparatus. A neck cord is also provided so that the vise may be used in the field at a stream or lake. The flexible member, arm, and foot joints may be adjusted to better wear the clamping apparatus in the field. A method of using the clamping apparatus at home and in the field is also disclosed.

9 Claims, 3 Drawing Sheets

UNIVERSAL FLY TYING VISE

BACKGROUND OF THE INVENTION

1. Field of Invention

This invention pertains to the art of methods and apparatuses for tying fishing flies, and more specifically to methods and apparatuses for precision holding of a fishing fly as it is tied either at home or at the fishing site.

2. Description of the Related Art

In the past, vises used for tying fishing flies at the fishing site cumbersome and were difficult to use. Existing vises designed for field use were either hand-held or would require a particular surface by which to mount the base. Locating a suitable surface in which to stabilize the vise at a comfortable orientation posed a problem. Also, many precision vises could not be used at the fishing site because they had bases that were not practical at a stream or lake. Applicant recognized the need to develop a precision vise or clamping apparatus that would easily clamp and unclamp a fishing lure or a similar small object that could be worn while used in the field or could be placed on a table when used in the home or workplace.

The present invention contemplates a new and improved vise for tying fishing lures which is simple in design, effective in use, and overcomes the foregoing difficulties and others while providing better and more advantageous overall results.

SUMMARY OF THE INVENTION

In accordance with the present invention, a new and improved vise for tying fishing flies is provided which may be clamped or unclamped by moving a trigger and may be used at home or in the field.

More particularly, according to one aspect of the present invention, a clamping apparatus for use in tying fishing flies includes a vise that has a first extended portion and a second extended portion. The first extended portion and the second extended portion are substantially parallel. The first extended portion has a first hole, the second extended portion has a second hole, and the first hole and the second hole are aligned. The clamping apparatus also includes a trigger pin that is disposed through the first hole and the second hole. The trigger pin has a substantially circular and flat first end adjacent to the first extended portion, the first end has a centered first pinhole, and a threaded second end adjacent to the second extended portion. The clamping apparatus further includes a knob that is screwed onto the threaded second end of the trigger pin adjacent the second extended portion, a trigger that has a circular portion, the circular portion has a second pinhole offset from a center of the circular portion, the second pinhole is aligned with the first pinhole, the trigger has a handle portion, and a pin disposed through the first pinhole and the second pinhole.

According to another aspect of the present invention, a clamping apparatus includes a base, an arm attached to and extending from the base, at least two legs that extend from the base to support the base, a clamping apparatus for clamping and holding an associated material, and a stabilization apparatus for stabilizing the base and the at least two legs.

According to another aspect of the present invention, a method of tying fishing flies on a table with a clamping apparatus, the clamping apparatus including a base, an arm connected to the base, a vise connected to the arm, a first leg and a second leg connected to the base, a first foot joint connected to the first leg, a second foot joint connected to the second leg, a flexible member connected to the first foot joint and the second foot joint, and a neck cord, includes the steps of adjusting the first foot joint to be flat on the table, adjusting the second foot joint to be flat on the table, flexing the flexible member to stabilize the clamping apparatus on the table, rotating the arm to position the vise, clamping the fishing hook with the vise, and tying the fishing fly.

According to another aspect of the present invention, a method of a user tying fishing flies at a stream with a clamping apparatus, the clamping apparatus including a base, an arm connected to the base, a vise connected to the arm, a first leg and a second leg connected to the base, a first foot joint connected to the first leg, a second foot joint connected to the second leg, a flexible member connected to the first foot joint and the second foot joint, and a neck cord, includes the steps of placing the neck cord around the neck of the user, positioning the clamping apparatus with the first leg, the second leg, and the base against the abdomen or chest of the user, adjusting the first foot joint to be flat on the abdomen of the user, adjusting the second foot joint to be flat on the abdomen of the user, flexing the flexible member to stabilize the clamping apparatus on the abdomen of the user, rotating the arm to position the vise, clamping the fishing hook with the vise, and tying the fishing fly.

The primary advantage of the present invention is that the clamping apparatus may be worn and used by the angler at the fishing site.

One other advantage of the present invention is that the clamping apparatus may be placed on a table and used at home to tie fishing flies.

Another advantage of the present invention is the arm, foot joints, and flexible member of the clamping apparatus are adjustable to better conform to the user.

Another advantage of the present invention is that the cam trigger activated vise is simple to clamp and unclamp.

Another advantage of the present invention is that the vise can rotate 360° about the axis of the attached arm for greater viewing of workpiece by the user.

Another advantage of the present invention is that the arm may be swung down and out-of-the-way when worn while angling/fishing.

Another advantage of the present invention is the teardrop-shaped locking nut used for controlled positioning of the vise or arm at any point within a full 360° range of rotation.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENT

Figure 1:
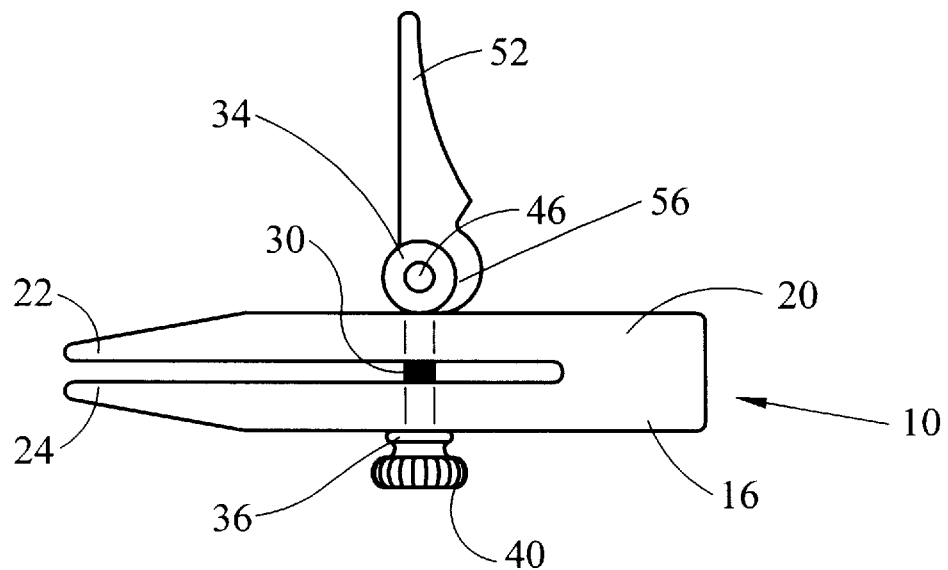
FIG. 1 is a plan view of an open vise of a clamping apparatus.

Referring now to the drawings wherein the showings are for purposes of illustrating a preferred embodiment of the invention only and not for purposes of limiting the same, FIG. 1 shows a plan view of the top of a clamping apparatus 10. The clamping apparatus 10 has a vise 16 that has a solid portion 20, a first extended portion 22, and a second extended portion 24. When the clamping apparatus is in the open position as shown in FIG. 1, the first and second extended portions 22,24 do not contact one another. A trigger pin 30 fits through openings in the extended portions 22, 24 of the vise 16. The trigger pin 30 has a circular end portion 34 that preferably lies flush against the first extended portion 22 of the vise 16. The opposite end 36 of the trigger pin 30 is preferably threaded and capable of receiving a vise knob 40. Turning the vise knob 40 in clockwise fashion preferably shortens the trigger pin 30 to fine adjust the clamping apparatus 10. The circular end portion 34 has a hole in the center through which a pin 46 is disposed. The clamping apparatus also contains a trigger 52 that operates to clamp and unclamp the vise 16. The trigger 52 also has a circular trigger portion 56. A hole is offset from the center of the circular trigger portion 56 of the trigger 52. The circular trigger portion 56 of the trigger 52 is aligned with the circular end portion 34 of the trigger pin 30. The pin 46 is disposed through the hole in the circular end portion 34 and the hole in the circular trigger portion 56.

Figure 2:
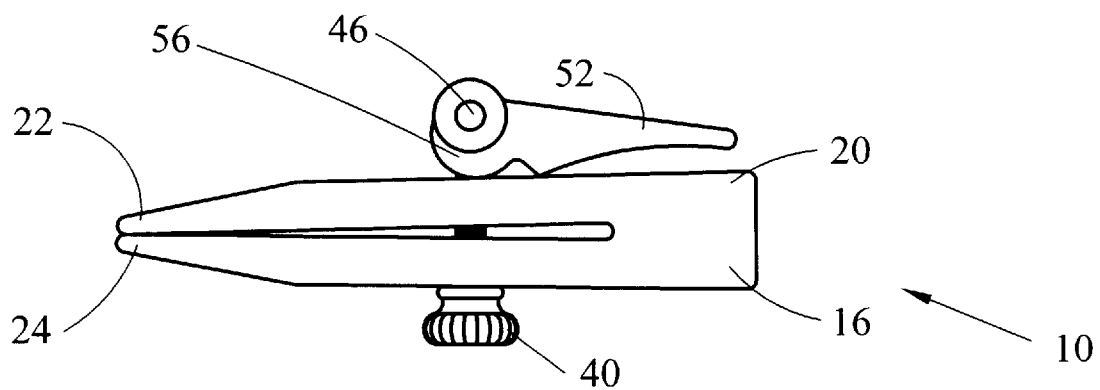
FIG. 2 is a plan view of a closed vise of the clamping apparatus.

With continuing reference to FIG. 1 and reference to FIG. 2, when the trigger 52 is rotated to the closing position as shown in FIG. 2, the offset hole in the circular trigger portion 56 is moved away from the first extended portion 22 of the vise 16. Movement of the offset hole in the circular trigger portion 56 also pulls the trigger pin 30, which is connected to the circular trigger portion via pin 46. By pulling the trigger pin 30 up, the vise knob 40 attached to the opposite end 36 of the trigger pin pushes the second extended portion 24 of the vise 16 into contact with the first extended portion 22 of the vise, thereby closing or clamping the clamping apparatus 10. In the preferred embodiment of the invention, the vise 16 is made of beryllium copper, although any suitable material may be used. The trigger 52 and vise knob 40 are preferably brass, and the trigger pin 30 and pin 46 are preferably stainless steel, although any suitable materials may be used.

Figure 3:
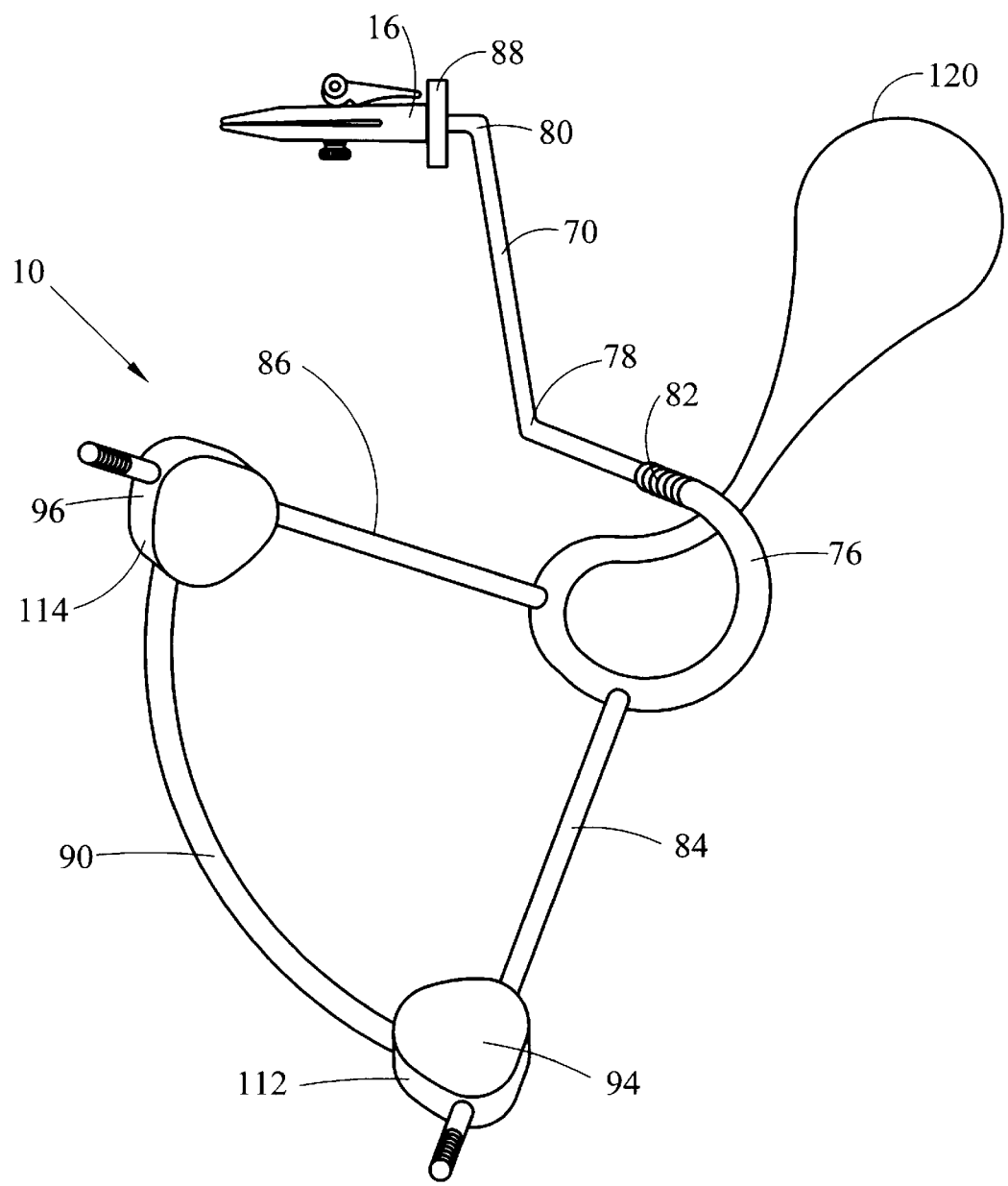
FIG. 3 is a view of the entire clamping apparatus.

FIG. 3 shows the entire clamping apparatus 10. The vise 16 is attached to an arm 70 that extends from a base 76. The arm 70 may be any suitable shape, but the arm preferably has two elbows 78,80 to place the vise 16 in a preferred position as shown in FIG. 3. The arm 70 has a locking nut 82 that enables it to be rotated to best position the vise 16 relative to the user. Lock nut 88 is effective to secure vise 16 in the desired location about arm 70 and elbow 80. Specifically, in some situations, the vise 16 preferably rotates 360° to enable the user to effectuate certain movements. However, at other times, the vise 16 needs to be locked into position. This is easily accomplished through the provision of lock nut 88. Additionally, two legs 84,86 extend from the base 76 to support the clamping apparatus 10 on a table. The legs 84,86 are preferably rigidly attached to the base 76, and a flexible member, such as flexible spring 90, is connected between the ends of the legs to provide greater stability. The flexible spring 90 is preferably attached to foot joints 94,96 that connect the flexible spring to the legs 84,86.

Figure 4:
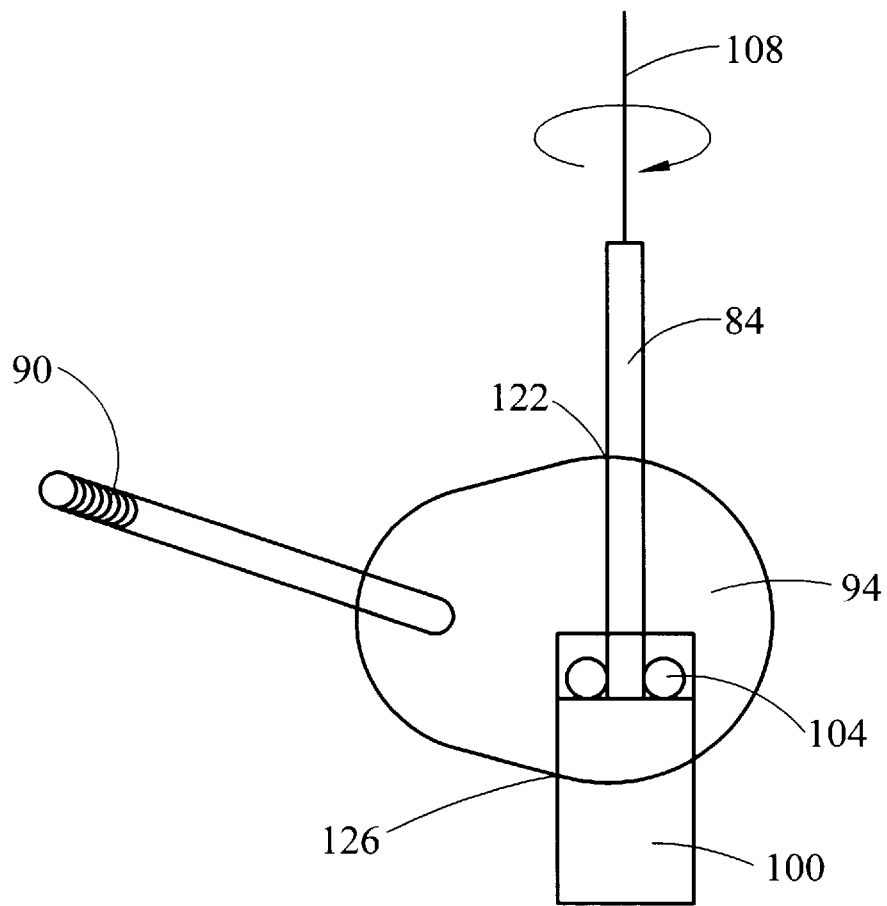
FIG. 4 is a detailed view of a foot joint of the clamping apparatus.

FIG. 4 shows a detailed view of one of the foot joints 94,96. The foot joint 94 has a first hole 122 into which the leg 84 is inserted. A leg knob 100 set in a second hole 126 larger than the first hole secures the leg 84 to the foot joint 94. An O-ring 104 is preferably employed to allow the foot joint 94 to pivot about the axis 108 of the leg 84 by providing a soft buffer between the leg knob 100 and the foot joint. The flex spring 90 is fixedly attached to the foot joint 94.

With continuing reference to FIGS. 3 and 4, the clamping apparatus 10 may be set on a table by adjusting the foot joints 94,96 so that the flat portions 112,114 of the foot joints contact the table. The clamping apparatus 10 also preferably contains a neck cord 120 that is attached to the base 76. The neck cord 120 allows the clamping apparatus 10 to be worn in the field so that the vise 16 may be used to tie flies at the fishing site. The neck cord 120 is preferably adjustable and preferably includes padding for the neck of the user. To wear the clamping apparatus 10, the foot joints 94,96 and flexible spring 90 may be adjusted so that the flexible spring supports the clamping apparatus about the abdomen of the user while the neck cord supports the base of the clamping apparatus.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A clamping apparatus for use in tying fishing flies, said clamping apparatus comprising:

a vise, said vise having a first extended portion and a second extended portion, said first extended portion and said second extended portion being substantially parallel, said first extended portion having a first hole, said second extended portion having a second hole, said first hole and said second hole being aligned;

a trigger pin, said trigger pin being disposed through said first hole and said second hole, said trigger pin having a substantially circular and flat first end adjacent to said first extended portion, said first end having a centered first pinhole, and a threaded second end adjacent to said second extended portion;

a knob, said knob being screwed onto said threaded second end of said trigger pin adjacent said second extended portion;

a trigger, said trigger having a circular portion, said circular portion having a second pinhole offset from a center of said circular portion, said second pinhole being aligned with said first pinhole, said trigger having a handle portion;

a pin disposed through said first pinhole and said second pinhole;

a base for supporting said clamping apparatus;

an arm, a first end of said arm being connected to said vise, a second end of said arm being connected to said base;

a first leg, a first end of said first leg being attached to said base;

a second leg, a first end of said second leg being attached to said base; and, flexing means for adjusting said first leg and said second leg to stabilize said clamping apparatus, said flexing means having a first foot joint attached to a second end of said first leg;

a second foot joint attached to a second end of said second leg; and, a flexible member, a first end of said flexible member being attached to said first foot joint and a second end of said flexible member being attached to said second foot joint.

2. The clamping apparatus of claim 1 wherein said first foot joint has a hole, said second end of said first leg being disposed through said hole, and a knob attached to said second end of said first leg to hole said first leg to said first foot joint.

3. The clamping apparatus of claim 1 wherein said second foot joint has a hole, said second end of said second leg being disposed through said hole, and a knob attached to said second end of said second leg to hold said second leg to said second foot joint.

4. The clamping apparatus of claim 1 further comprising holding means for holding the clamping apparatus on the person of the user.

5. A clamping apparatus comprising:

a base;

an arm, said arm being attached to and extending from said base;

a first leg extending from said base to support said base;

a second leg extending from said base to support said base;

clamping means for clamping and holding an associated material; and, stabilization means for stabilizing said base and said first and second legs, said stabilization means comprising:

a first foot joint attached to said first leg, said first foot joint being pivotable about said first leg;

a second foot joint attached to said second leg, said second foot joint being pivotable about said second leg; and, a flexible member connected to said first foot joint and said second foot joint.

6. The clamping apparatus of claim 5 further comprising holding means for holding the device on the person of the user.

7. The clamping apparatus of claim 6 wherein said holding means comprises a cord to be worm around the neck of the user.

8. The clamping apparatus of claim 5 wherein said clamping means comprises:

a vise, said vise having a first arm and a second arm, said first arm and said second arm being substantially parallel, said first arm having a first hole, said second arm having a second hole, said first hole and said second hole being aligned;

a trigger pin, said trigger pin being disposed through said first hole and said second hole, said trigger pin having a substantially circular and flat first end next to said first arm, said first end having a centered first pinhole, and a threaded second end next to said second arm;

a knob, said knob being screwed onto said threaded second end of said trigger pin adjacent said second arm;

a trigger, said trigger having a circular portion, said circular portion having a second pinhole offset from a center of said circular portion, said second pinhole being aligned with said first pinhole, said trigger having a handle portion; and, a pin disposed through said first pinhole and said second pinhole.

9. The clamping mechanism of claim 4 wherein said trigger is near a center portion of said vise.

* * * * *